Figure 1:
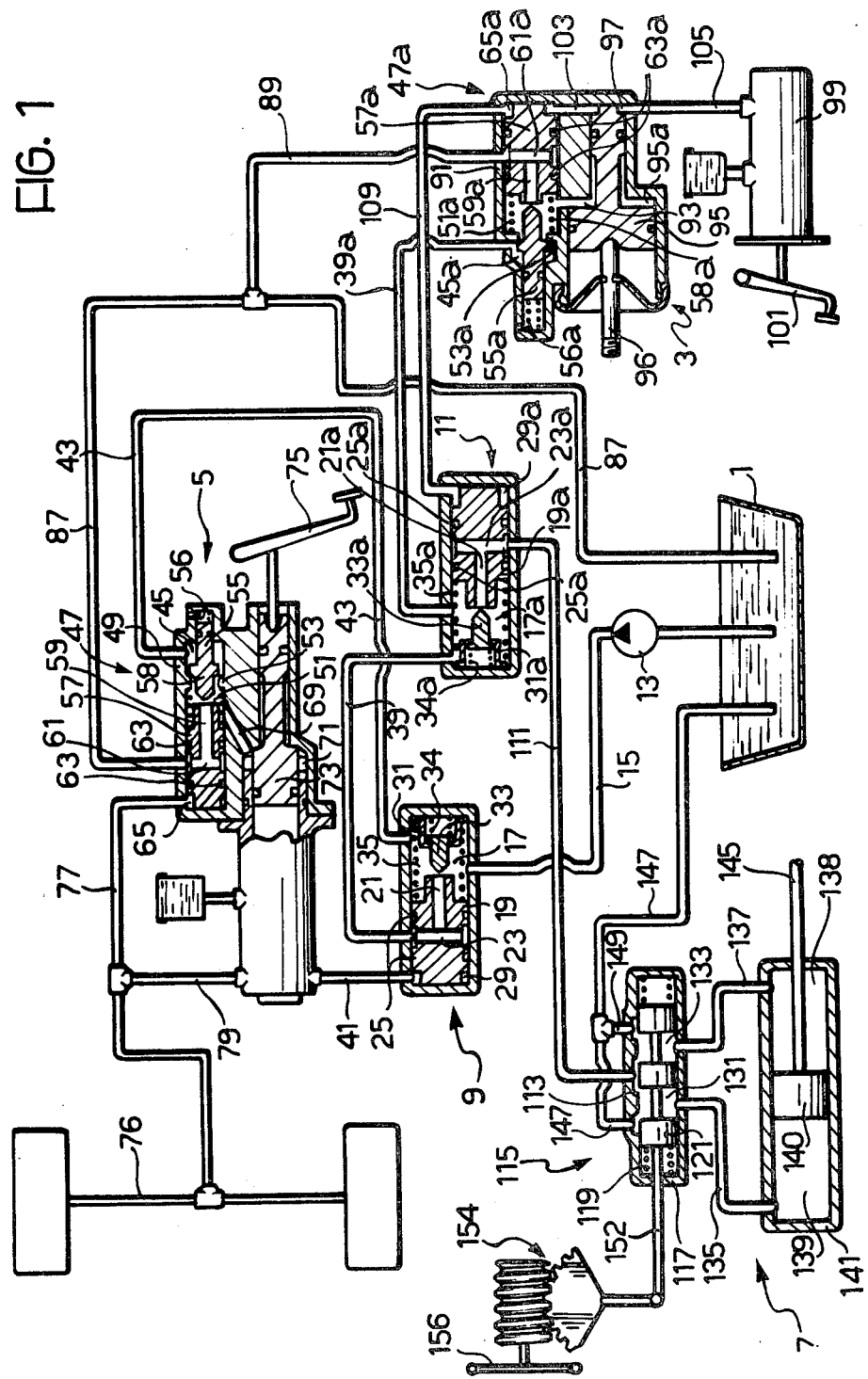

United States Patent [19]

Amedei et al.

[11] 4,130,990
[45] Dec. 26, 1978

[54] HYDRAULIC SYSTEM FOR FEEDING A PLURALITY OF INDEPENDENT HYDRAULIC SERVO-OPERATED DEVICES

[75] Inventors: Giuseppe Amedei; Enrico Rivetti, both of Turin; Antonino Bertone, Sant'Antonino, all of Italy

[73] Assignee: FIAT Societa per Azioni, Turin, Italy

[21] Appl. No.: 816,070

[22] Filed: Jul. 15, 1977

[30] Foreign Application Priority Data

Jul. 20, 1976 [IT] Italy ............................... 68810 A/76

[51] Int. Cl.² ............................................. F16D 31/00
[52] U.S. Cl. ........................................ 60/422; 60/484; 60/548
[58] Field of Search ............... 60/384, 420, 422, 484, 60/486, 581, 698, 548; 192/12 R

[56] References Cited

U.S. PATENT DOCUMENTS

| | | | |
|---|---|---|---|
| 3,199,286 | 8/1965 | Anderson | 60/420 |
| 3,941,142 | 3/1976 | Adachi et al. | 60/422 X |

*Primary Examiner*—Edgar W. Geoghegan

*Attorney, Agent, or Firm*—Sughrue, Rothwell, Mion, Zinn and Macpeak

[57] ABSTRACT

A hydraulic system for feeding a plurality of independent hydraulic servo-operated devices, such as servo-assisted brakes, clutch and/or servo-operated steering, in which a single pump draws fluid from a common reservoir and fluid pressure is automatically distributed by one or more modulating valves to the or each of the devices requiring power at any one time. The or each modulating valve comprises at least one piston in a cylinder, the piston being displaced by an increase in pressure due to displacement of one or more operating member such as brake or clutch pedal, or steering wheel, this controlling the flow of fluid through an axial passage in the piston by controlling its proximity to a valve shutter element and thereby controlling the fluid pressure in a chamber of the modulating valve, which pressure is fed to a control chamber of at least one distributor associated with a servo actuator of one of the servo operated devices of the system whereby to control the operating pressure applied to this.

2 Claims, 2 Drawing Figures

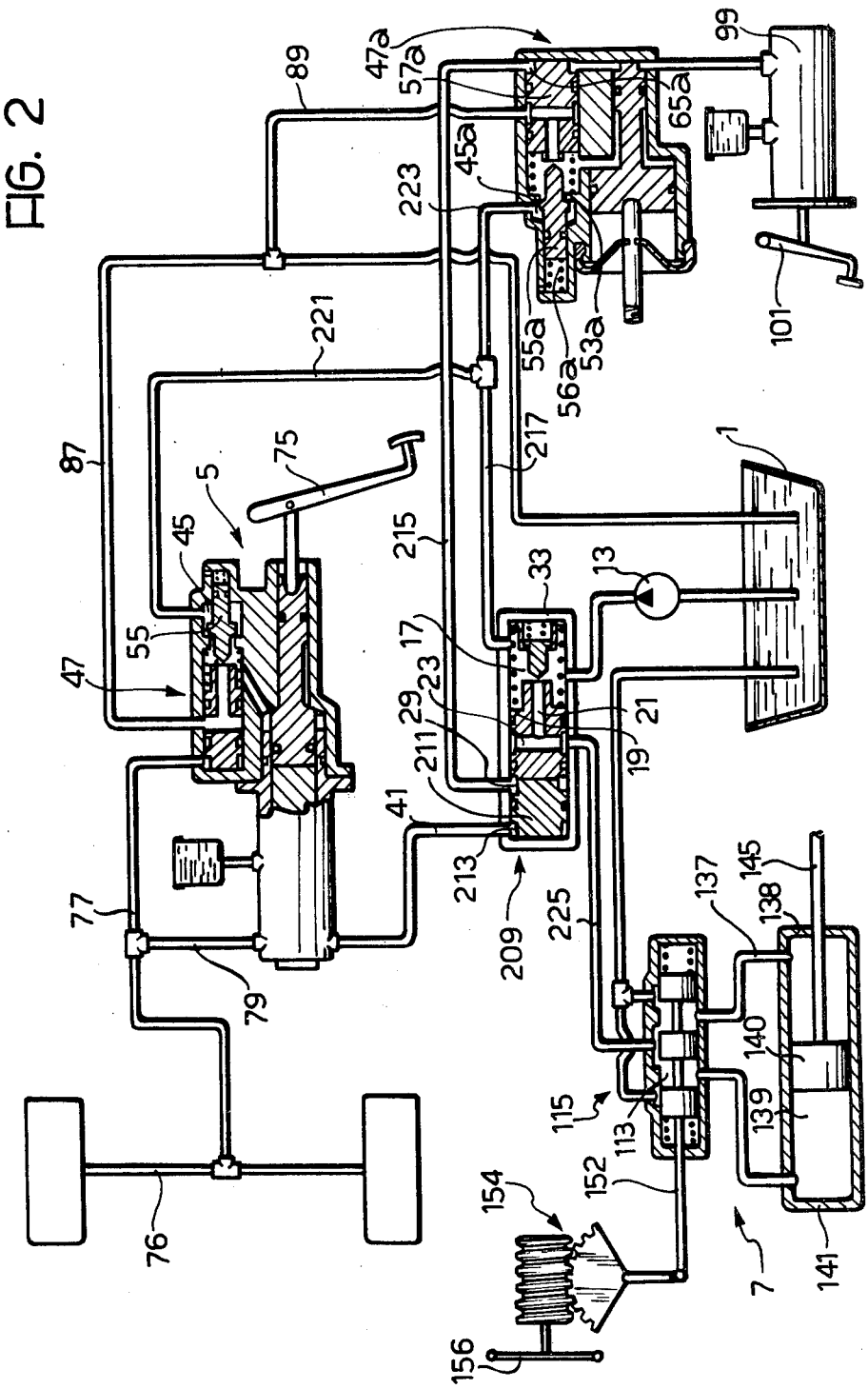

HYDRAULIC SYSTEM FOR FEEDING A PLURALITY OF INDEPENDENT HYDRAULIC SERVO-OPERATED DEVICES

The present invention relates to an hydraulic system for feeding a plurality of independently operable hydraulic servo-operated devices, by using a single common pump and means for restricting the output of the pump whereby to increase the hydraulic pressure at the output. The present invention finds particular utility in connection with motor vehicles which make increasing use of servo-operation or servo-assistance for devices such as the steering and clutch as well as the brakes. With a number of servo-operated systems on a vehicle the problem arises of providing rationalised systems for providing the power for the servo actuators. Such systems should occupy the minimum of space possible, should be cheap and of great reliability and long life to avoid costly repairs.

When used herein the term "servo-operated device" will be understood to include a device which is servo-assisted as well as one which is entirely operated by a servomechanism. Likewise the term "servo-actuator" will be understood to refer to that part of a servo-mechanism which receives fluid pressure to generate the servo operating or servo assisting force. This may apply to either master cylinder or the slave cylinder of a servo-assisted hydraulic brake or clutch, for example.

One known type of motor vehicle servo-mechanism makes use of hydraulic circuits of the "full-power" type, that is circuits comprising a volumetric pump which draws hydraulic fluid from a reservoir and pumps it at a high pressure (about 200 Kg/cm$^2$) into suitable accumulators. The pressure of the hydraulic fluid in the accumulators is regulated by pressure limiting valves.

Other known hydraulic systems, although still using a volumetric pump, have totally eliminated the necessity for pressure accumulators and pressure limiting valves; this is the case, for example with at least some of the hydraulic systems manufactured by the firms Delco Moraine and Bendix. In particular the hydraulic system made by Delco Moraine, and illustrated in their report No. P 1178-228 of the 2 April 1974 relates to a device comprising a volumetric pump feeding a servo-assisted steering device together with a device for servo-assisting the brake. In this system, when the brake servo is used the steering servo is also put under pressure. This presupposes that the behaviour of the servo-assisted steering is not affected when the pressure upstream and downstream of the valve of the steering servo increases. Furthermore, the insertion of any further devices, for example a servo-assistance device for the clutch, is not possible.

The technical problem which this invention seeks to solve is the provision of an hydraulic system which allows the use of a number of independently operable devices without the use of pressure accumulators which is more versatile than the previously known systems of this type.

According to one aspect of this invention a hydraulic system for feeding a plurality of independent hydraulic servo-operated devices comprises a volumetric pump, first and second distributor devices of a type known per se, one associated with a servo-operated brake actuator and the other associated with a servo-operated clutch actuator, and each having a control chamber separated by a valve shutter from a pressure distribution chamber, a third distributor device of a type known per se associated with a servo-operated steering actuator and having an outlet leading to a reservoir, which outlet is open when the steering servo is not in use, in which hydraulic fluid from the volumetric pump is directed to the said first, second and third distributor devices by two modulating valves in the form of cylinders housing respective pistons which separate the cylinders into first and second chambers, each piston having an axial passageway communicating at one end with the first chamber of the modulating valve and at the other end with a transverse passageway in the piston, which communicates, in all positions of the piston, with an opening in the cylinder wall, and which is sealed from the two interior chambers of the cylinder by two sealing rings of the piston, the mouth of the axial passageway of each piston cooperating with a valve shutter element resiliently mounted in the first chamber of the modulating valve, whereby to restrict the flow of fluid through the said axial passage when the piston is displaced towards the said valve shutter element without ever completely closing the passage, the first chamber of the first modulating valve being connected to the said volumetric pump and to the control chamber of the first distributor device, the first chamber of the second modulating valve being connected to the control chamber of the second distributor device and to a conduit communicating, through an opening in the cylinder wall, with the said transverse passage in the piston of the first modulating valve, the transverse passageway in the piston of the second modulating valve being connected to the third distributor device, the second chamber of the first modulating valve being connected to the servo-actuator associated with the first distributor, and the second chamber of the second modulating valve being connected, via the second distributor to the servo actuator associated therewith.

According to another aspect of the invention a hydraulic system for feeding a plurality of independent hydraulic servo-operated devices, comprises a volumetric pump, first and second distributor devices of a type known per se, one associated with a servo-operated brake actuator and the other associated with a servo-operated clutch actuator, and each having a control chamber separated by a valve shutter from a pressure distribution chamber, a third distributor device of a type known per se associated with a servo-operated steering actuator and having an outlet leading to a reservoir, which outlet is open when the steering servo is not in use, in which hydraulic fluid from the volumetric pump is directed to the said first, second and third distributor devices by a modulating valve in the form of a cylinder housing first and second slidable pistons which separate the cylinder into first, second and third chambers the first piston having an axial passageway which communicates at one end with the first chamber of the modulating valve and at the other end with a transverse passageway in the piston, which communicates, in all positions of the piston, with an opening in the cylinder wall, and which is sealed from the said interior chambers of the cylinder by two sealing rings of the piston, the mouth of the axial passageway cooperating with a valve shutter element resiliently mounted in the said first chamber of the modulating valve, whereby to restrict the flow of fluid through the said axial passage when the first piston is displaced towards the said valve shutter element without ever completely closing the passage, the first chamber being connected to the output from the said volumetric pump and to the control chambers of the said first and second distributor devices, the second chamber of the modulating valve being connected to a servo-actuator associated with one of the said distributor devices, the third chamber of the modulating valve being connected to a servo-actuator associated with the other of the said distributor devices, and the said transverse passage in the first piston being connected, through an opening in the cylinder wall, to the third distributor device.

Two embodiments of this invention will now be more particularly described, by way of example, with reference to the accompanying drawings, in which:

FIG. 1 is a schematic diagram illustrating a first embodiment of this invention; and FIG. 2 is a schematic diagram illustrating a second embodiment of this invention.

With reference to the drawings, and particularly to FIG. 1 thereof, there is shown a hydraulic system having six main units which are a reservoir 1 containing hydraulic fluid, a servo-assisted clutch slave cylinder 3, a servo-assisted brake master cylinder 5, a servo-assisted steering device 7, and first and second substantially identical pressure modulating valves 9 and 11. Hydraulic fluid is drawn from the reservoir 1 by a volumetric pump 13, driven directly or indirectly from the engine of the motor vehicle, and fed along a pipe 15 to the first modulating valve 9 where it enters a first internal chamber 17 within the modulating valve 9. In fact, the modulating valve 9 comprises a hollow cylinder closed at both ends and housing a piston 19. The piston 19 is provided with two axial projections and separates the cylinder into a first chamber 17 and a second chamber 29. The first axial projection of the piston 19, which extends into the first chamber 17, has an axial passage 21 which extends in to the central part of the piston 19 where it meets a radial transverse through passage 23 which opens into the wall of the piston 19 between two sealing rings 25.

Inside the chamber 17 is located coaxially with the axial passage 21 and carried on a support 31, a valve element 33 having a conically pointed end facing towards the axial passage 21 in the first axial projection of the piston 19. The valve element 33 is held in position against the support 31 by a spring 34. The piston 19 is biased away from the valve element 33 by a spring 35.

Since the second modulating valve 11 is substantially the same as the valve 9 it will not be separately described. When during this description the component parts of the valve 11 are referred to they will be indicated by the same numbers as are used for the corresponding parts of the valve 9 with the addition of an "a" to distinguish them.

The radial transverse passage 23 in the piston 19 communicates with a circumferential groove in the piston 19 which, in turn, communicates through an opening in the cylinder wall with a conduit 39 leading to the first chamber 17a of the valve 11. The circumferential groove in the piston 19 has sufficient axial extent that the passage 23 remains in free communication with the conduit 39 whatever the displacement of the piston 19. The second chamber 29 of the valve 9 communicates, through a conduit 41, with the compression chamber (not separately shown in FIG. 1) of the brake master cylinder 5, which has an associated distributor 47, whilst the first chamber 17 is connected, through a conduit 43, to a chamber 45 of the said distributor 47 associated with the brake master cylinder. The master cylinder and distributor arrangement 5 are more fully described in Italian Patent Application No. 69786 A/75 filed on Dec. 11, 1975 by the same applicants.

Briefly, the distributor 47 comprises a hollow cylinder 49, closed at both ends and separated into first and second chambers 45 and 51 by an annular ridge 53 projecting inwardly from the cylinder wall. Within the first chamber 45 is located, slidably, a valve shutter 55 having a conically pointed end and a circumferential ridge which is urged to abut against the ridge 53 by a biasing spring 56 acting on the shutter 55. The conically pointed end of the shutter 55 projects into the second chamber 51 and cooperates with the mouth of an axial passage 59 of a piston 57 housed slidably in the chamber 51 and biased by a spring 58 towards the left of the drawing. The piston 57 is substantially identical to the piston 19 of the modulating valve 9 and has, as well as the axial passage 59, a radial transverse passage 61 which communicates therewith and opens into the piston wall between two sealing rings 63. The piston 57 also defines, with the end of the cylinder 49 remote from the chamber 51 a third chamber 65 into which extends a projection of the piston 57; the second chamber 51 is connected by an internal passage 69 in the distributor to a chamber 71 of the brake master cylinder, in which chamber is housed a part of a control piston 73, the position of which is determined by the brake pedal 75. The control piston has a part of greater diameter and a part of smaller diameter, and the chamber 71 houses the part of greater diameter.

Chamber 65 of the distributor 47 is connected to the braking circuit of the vehicle via a pipeline 77 which has a branch 79 leading to the compression chamber of the master cylinder. A discharge conduit 87 communicates with the transverse passage 61 in the distributor piston 57, through an opening in the cylinder wall, and leads to the reservoir 1. From the discharge conduit 87 branches a conduit 89 which leads into a transverse passage 61a in the piston 17a of a distributor 91 associated with the servo assisted clutch slave cylinder 3. This distributor will not be described in detail as it is identical with the distributor associated with the brake master cylinder and its component parts will therefore be identically indicated but with the addition of an "a" to distinguish them.

From the second chamber 51a of the distributor 91, an internal passageway 93 leads to a chamber 95 in the clutch slave cylinder 3. This slave cylinder has a part of larger diameter housing the larger diameter part of a control piston having two diameters, mounted slidably and sealingly in the clutch slave cylinder for controlling the position of the control rod 96 of the clutch, and a part of smaller diameter housing the smaller diameter part of the control piston. The chamber 95 is defined between sealing rings and the larger and smaller diameter parts of the piston and includes the shoulder between the larger and smaller diameter parts of the cylinder.

At the smaller diameter end of the piston 95 a second slave cylinder chamber 97 is defined by an axial projection of the piston itself, between the piston 95 and the end of the smaller diameter part of the slave cylinder. The second clutch slave cylinder chamber is in communication with the third chamber 65a of the distributor 91 and with the compression chamber (not shown) of a clutch master cylinder 99, controlled by the clutch pedal 101 through conduits 103 and 105 respectively.

The third chamber 65a is also connected, by a conduit 109 to the second chamber 29a of the second modulating valve 11.

The transverse passage 23a in the piston 19a of the second modulating valve 11 communicates through an opening in the cylinder wall with a conduit 111 which leads into an interior chamber 113 of a distributor 115 of the servo steering device 7.

Said steering servo distributor 115, as shown schematically in the drawing comprises a hollow cylinder 117 which is closed at both ends. The interior chamber 113 of the cylinder 117 houses a slidable piston 121 having three parts of larger diameter spaced by two parts of smaller diameter which define two control chambers 131 and 133. The control chambers 131 and 133 are connected through openings in the cylinder wall to respective conduits 135 and 137 leading to two chambers 138 and 139 respectively of an hydraulic actuator which provides power assistance for steering. This actuator comprises a piston 140 mounted slidably in a hollow cylinder 141 and connected to the steering linkage (not shown) through a piston rod 145. The two chambers 131 and 133 of the steering servo distributor are connected through respective openings in the cylinder wall to respective discharge conduits 147 and 149 leading to the reservoir, and through a common opening in the cylinder wall to a supply conduit 111 leading from the second modulator valve 11.

The piston 121 of the steering servo distributor 115 is connected by a rod 152 with a gearing system 154 which is controlled by the steering wheel 156 of the vehicle whereby to transform the rotary motion of the steering wheel 156 into rectilinear movement of the piston 121. The three parts of the piston 121 of larger diameter are so positioned that when the piston 121 is in central position the interior chamber 113 of the distributor is in communication with the feed conduit 111 and also in equal communication with both the discharge conduits 147 and 149 so that both the conduits 135 and 137 are at the same pressure and the pressures in the two chambers 138 and 139 are equal. There is therefore no resultant force on the piston 140. When the distributor piston is moved to the left or right, however, the three larger parts 121 move to restrict communication between one or other of the conduits 147, 149 and the associated chamber 131, 133 and to enlarge the opening through which this chamber 131, 133 respectively communicates with the feed conduit 111, thereby raising the pressure in this chamber and consequently in the corresponding chamber 139, 138 respectively, in the servo-assisting cylinder 141.

The operation of the hydraulic circuit described above is as follows:

When the pump 13 is operating it draws hydraulic fluid from the reservoir 1, and pumps it along the conduit 15 to the first chamber of the first modulating valve 9 from where it passes through the axial passageway 21 in the piston 19 and out, via the radial transfer passage 23 into the conduit 39 which feeds it into the first chamber 17a of the second modulating valve 11. From here the hydraulic fluid can flow either along the conduit 39a into the distributor valve associated with the clutch slave cylinder 3, or through the axial passageway 21a and radial transverse passage 23a in the piston 19a and out along the feed conduit 111 to the distributor valve 115 of the steering servo 7. Hydraulic fluid under pressure fed to the first chamber 17 of the first modulating valve 9 can also flow out through the conduit 43 to the distributor valve associated with the brake master cylinder servo 5 where it enters the chamber 45 of the distributor 47.

Any of the three servo assisted devices of the circuit, that is the brake servo, the clutch servo or the steering servo can be operated independently from the others, and any combination, or all three, can be operated at any one time without the operation of one affecting the other. For example, when the clutch pedal 101 is depressed, the clutch master cylinder 99 applies pressure to the conduit 105 which is fed into the chamber 97 of the clutch slave cylinder 3 causing the piston 95 to displace to the left in FIG. 1. The hydraulic fluid is also fed from the chamber 97 along the conduit 103 to the chamber 65a of the clutch slave cylinder distributor valve causing the piston 57a to displace to the left thereby restricting the opening at the mouth of the axial passage 59a. From the chamber 65a fluid under pressure can also flow along the conduit 109 to the second chamber 29a of the second modulating valve 11. The piston 19a of the second modulating valve 11 is thus also displaced to the left like the piston 95 of the clutch slave cylinder and the piston 57a of the clutch slave cylinder distributor 91. The displacement of the piston 19a to the left restricts the opening in the axial passage 21a by approach of the mouth thereof to the conical end of the valve shutter element 33a and this causes an increase in the pressure in the first chamber 17a of the second modulating valve 11. Because of the resilient biasing of the valve shutter element 33a by the spring 34a the axial passageway 21a in the piston 19a can never be fully closed so that the pressure in the conduit 111 is never lost. The increase in pressure in the first chamber 17a of the second modulating valve 11 is fed through the conduit 39a to the chamber 45a of the clutch slave cylinder distributor 91.

The pressure applied to the clutch pedal 101 therefore, as well as causing a direct displacement of the clutch slave cylinder 95, also increases the pressure in the feed conduits of the servo system causing the piston 57a eventually to displace the valve element 55a from the inwardly projecting annular ridge 53a thereby allowing the pressure in the chamber 45a to pass into the chamber 51a and from there along the internal passageway 93 to the chamber 95a thereby applying a pressure to the piston 95, in addition to the pressure applied in the chamber 97 by the master cylinder 99, as a servo assisting force.

The operation of the servo steering device is as follows:

By turning the steering wheel 156 the rotary motion, transmitted through the gears 154, is transformed into rectilinear motion of the piston rod 152 causing displacement to the left or right of the piston 121. If, for example, the piston 121 is displaced to the left (as viewed in FIG. 1) the communication between the chamber 131 and the conduit 147 is enlarged whilst the communication between the chamber 131 and the feed conduit 111 is restricted; the pressure in the chamber 131 therefore falls and, likewise, the pressure in the chamber 139 of the servo assisting actuator 141 also falls. At the same time the displacement to the left of the piston 121 of the steering servo distributor 115 restricts the communication between the chamber 133 and the discharge conduit 149 and enlarges communication between this chamber and the feed conduit 111 so that the pressure in the chamber 133, and therefore, via the conduit 137, in the chamber 138 of the servo actuator 141, increases. The pressure across the piston 140 thus causes this to displace to the left moving the piston rod 145 and the steering linkage to which it is attached. As mentioned above operation of the steering servo 7 can take place at the same time as operation of the clutch because the conical end of the valve element 33a never completely closes the axial passage 21a in the piston 19a due to its resilient mounting in the support 31a by the spring 34a so that there is always a fluid pressure in the conduit 111 when the pump 13 is operating. Displacement of the piston 121 to the right in FIG. 1 by turning the steering wheel 156 in the opposite direction will cause the pressure difference across the piston 140 of the servo actuator 141 to be reserved thereby causing displacement of the piston 140 and piston rod 145 in the opposite direction.

The servo assisted brakes operate as follows: upon depression of the brake pedal 75 the master cylinder piston is displaced to the left increasing the pressure in the conduits 79 and 41 which are connected to the master cylinder compression chamber. The increase in pressure in the conduit 79 is fed via the brake pipe 76 to the brakes of the wheels of the vehicle to commence braking, and also via the conduit 77 into the third chamber 65 of the brake servo distributor 47. The increase in fluid pressure in the conduit 41 is fed to the second chamber 29 of the first modulating valve 9 and therefore the piston 19 of the first modulating valve 9 begins to displace to the right as does the piston 57 in the brake servo distributor 47. The axial passages 21, 59 in these two pistons are thus progressively restricted by the conical ends of the valve elements 33, 55 respectively and this has the effect, in the first modulating valve 9, of restricting the flow of fluid along the axial passage 21 in the piston 19 thereby increasing the pressure in the chamber 17, and in the chamber 71 of the brake servo distributor 47 of closing the outflow when the piston 57 abuts the conical end of the valve plunger 55. Further increase in the pressure on the brake pedal causes further displacement of the pistons 19 and 57. This causes a further increase in the pressure in the chamber 17 which is led, via the conduit 43 to the first chamber 45 of the brake servo distributor 47. The further increase in the pressure applied by the brake pedal 75 also causes an increase in the pressure in the conduit 79 leading to the third chamber 65 of the brake servo distributor 47 which causes displacement to the right of the piston 57 which, since it is already in contact with the valve plunger 55, causes displacement of this plunger opening communication between the first chamber 45 of the brake servo distributor 47 and the second chamber 51 thereof. Fluid under pressure in the first chamber 45 of the brake servo distributor 47 can thus flow into the second chamber 51 and from there, via the internal passageway 69 to the chamber 71 where it assists the force exerted on the master cylinder piston by the brake pedal 75.

When the servo assisted brake master cylinder 5 is in operation pressure is still fed to the clutch and steering servo devices by the first modulating valve 9 since the axial passageway 21 in the piston 19 is never fully closed by the valve element 33 due to its resilient mounting in the support 31 by the spring 34.

If, for example, both the brake and clutch are operated together, the ratio in pressure between the conduits 43 and 39a, which are applied as servo assisting forces via the brake servo distributor 47 and the clutch servo distributor 47a will correspond to the pressures exerted by the respective pedals although, of course, the absolute value of these pressures will depend on whichever is the greatest force applied to one or other of the pedals. When neither the brake pedal 75 nor the clutch pedal 101 is depressed, but the steering servo 7 is operated, the pressure generated by the pump 13 is fed to all three servo devices, but is only used by the steering servo 7 since it is stopped by the valve plungers 55 of the brake servo distributor 47 and 55a of the clutch servo distributor 47a which remain against the inwardly projecting annular ridges 53 and 53a.

In FIG. 2 there is illustrated a second embodiment of the invention which differs from the first embodiment in that it has a single modulating valve 209 in place of the first and second modulating valves 9 and 11 of the embodiment of FIG. 1. The modulating valve 209 is similar to the modulating valve 9 in the embodiment of FIG. 2, with the exception of the provision of a second piston 211 in the second chamber 29, abutting the projection of the piston 19 and defining between itself and the end of the cylinder a third chamber 213. Otherwise, the component parts of the modulating valve 209 are identical with those of the modulating valve 9 and are referred to in FIG. 2 with the same reference numerals. The connecting conduits between the valve 209 and the various servo devices of the system are also different from those of FIG. 1. The third chamber 213 of the modulating valve 209 communicates with the conduit 41 leading from the pressure chamber of the brake master cylinder and the second chamber 29, which is now an intermediate chamber, communicates with a conduit 215 leading to the chamber 65a of the clutch servo distributor 47a. The first chamber 17 of the modulating valve 209, in addition to being fed from the pump 13, is also connected by a conduit 217 to two branch conduits 221, 223 which lead respectively to the chambers 45 of the brake servo distributor and 45a of the clutch servo distributor. The transverse passage 23 in the piston 19 is in communication, through an opening in the cylinder wall, with a conduit 225 leading to the interior 113 of the steering servo distributor 115.

The operation of the embodiment illustrated in FIG. 2 is similar to that of the embodiment of FIG. 1 in that depression of the brake pedal 75 causes an increase in pressure in the conduit 41 raising the pressure in the third chamber 213 and displacing both the piston 211 and the piston 19 to the right restricting the mouth of the axial passage 21 and increasing the pressure in the chamber 17 which is fed via the conduit 217 and 221 to the chamber 45 of the brake servo distributor, and via the conduit 223 to the chamber 45a of the clutch servo distributor. Since the increase in pressure is due to the depression of the brake pedal 75 it is only the valve plunger 55 of the brake servo distributor 47 which will be displaced permitting the pressure in the first chamber 45 of the brake servo distributor to be fed, as described above, to provide assistance to the displacement of the master cylinder piston to reinforce the pressure exerted by the brake pedal 75. Because the clutch pedal 101 is not depressed the valve plunger 55a remains firmly pressed by the spring 56a against the annular radially inwardly projecting ridge 53a. Should the clutch pedal 101 be depressed, however, the piston 57a of the clutch servo distributor will eventually displace the valve element 55a permitting the servo assisting pressure to be fed to reinforce the pressure applied to the clutch slave cylinder piston by the clutch master cylinder 99. Likewise, if only the clutch pedal 101 is depressed the increase in pressure is fed from the clutch master cylinder 99 through to the conduit 213 as in the embodiment of FIG. 1, from where it is fed to the second chamber 29, causing displacement to the right of the piston 19 in the modulating valve 209, restricting the opening in the axial passage 21 and raising the pressure in the first chamber 17. This causes an increase in pressure in the conduits 217, 221 and 223 feeding the servo assisting pressure to the chambers 45 of the brake servo distributor and 45a of the clutch servo distributor. This time, since it is the clutch pedal 101 which is depressed, it is only the valve plunger 55a of the clutch servo distributor which will be displaced and the brake servo distributor 47 remains unoperated.

The steering servo operates in the same way as in the embodiment of FIG. 1.

In the two embodiments illustrated the braking circuits are shown with single brake pipelines although clearly, the addition of further pistons in the modulating valves 9, 11 or 209 and in the servo distributor valves could permit the use of dual circuit braking systems with or without servo assistance on both circuits.

We claim:

1. In a hydraulic system for feeding a plurality of independent hydraulic servo-operated devices, of the type comprising:
    a volumetric pump,
    a reservoir of hydraulic fluid,
    first and second distributor devices, one associated with a servo-operated brake actuator and the other associated with a servo-operated clutch actuator, and each having a control chamber separated by a valve shutter from a pressure distribution chamber,
    a third distributor device associated with a servo-operated steering actuator and having an outlet connected to said reservoir, which outlet is open when said steering servo is not operating,
    the improvement comprising:
    first and second modulating valves for directing hydraulic fluid from said volumetric pump to said first, second and third distributor devices, each of said first and second modulating valves comprising:
    a cylinder,
    a piston within said cylinder separating it into first and second chambers,
    means defining a transverse passageway in said piston,
    means defining an axial passageway in said piston communicating at one end with said first chamber of the modulating valve and at the other end with said transverse passageway in said piston,
    means defining an opening in the cylinder wall, said transverse passageway in said piston communicating, in all positions of said piston with said opening,
    two sealing rings on said piston sealing said transverse passageway in said piston from said first and second chambers of said cylinder, and
    a valve shutter element resiliently mounted in said first chamber of said modulating valve and cooperating with the mouth of said axial passageway of said piston whereby to restrict the flow of fluid through said axial passage when said piston is displaced towards said valve element without completely closing said axial passage,
    first conduit means connecting said first chamber of said first modulating valve to said volumetric pump,
    second conduit means connecting said first chamber of said first modulating valve to said control chamber of said first distributor device,
    third conduit means connecting said first chamber of said second modulating valve to said control chamber of said second distributor device,
    fourth conduit means communicating with said transverse passage in said piston of said first modulating valve being connected to said first chamber of said second modulating valve,
    fifth conduit means communicating with said transverse passageway in said piston of said second modulating valve being connected to said third distributor device,
    sixth conduit means connecting said second chamber of said first modulating valve to the servo actuator associated with said first distributor, and
    seventh conduit means connecting said second chamber of said second modulating valve to the servo actuator associated with said second distributor.

2. In a hydraulic system for feeding a plurality of independent hydraulic servo-operated devices, of the type comprising:
    a volumetric pump,
    a reservoir of hydraulic fluid,
    first and second distributor devices, one associated with a servo-operated brake actuator and the other associated with a servo-operated clutch actuator, and each having a control chamber separated by a valve shutter from a pressure distribution chamber,
    a third distributor device associated with a servo-operated steering actuator and having an outlet connected to said reservoir, which outlet is open when said steering servo is not operating,
    the improvement comprising:
    a modulating valve for directing hydraulic fluid from said volumetric pump to said first, second and third distributor devices, said modulating valve comprising:
    a cylinder,
    first and second slidable pistons within said cylinder which separate it into first, second and third chambers,
    means defining a transverse passageway in said first piston,
    means defining an axial passageway in said piston which communicates at one end with said first chamber of said modulating valve and at the other end with said transverse passageway in said piston,
    means defining an opening in the cylinder wall, said transverse passageway in said piston communicating in all positions of said piston, with said opening,
    two sealing rings on said piston sealing said transverse passageway in said piston from said first and second chambers of said cylinder, and
    a valve shutter element resiliently mounted in said first chamber of said modulating valve, and cooperating with the mouth of said axial passageway of said piston, whereby to restrict the flow of fluid through said axial passage when said first piston is displaced towards said valve shutter element without completely closing said axial passage,
    first conduit means connecting said first chamber of said modulating valve to the output from said volumetric pump,
    second conduit means connecting said first chamber to the control chambers of said first and second distributor devices, third conduit means connecting said second chamber of said modulating valve to a servo-actuator associated with one of said distributor devices, fourth conduit means connecting said third chamber of said modulating valve to a servo-actuator associated with the other of said distributor devices, and fifth conduit means communicating with said transverse passage in said first piston and being connected, to said third distributor device.

* * * * *